(12) United States Patent
Biris et al.

(10) Patent No.: US 10,855,082 B2
(45) Date of Patent: Dec. 1, 2020

(54) OPERATING A WIND TURBINE GENERATOR DURING AN ABNORMAL GRID EVENT

(71) Applicant: VESTAS WIND SYSTEMS A/S, Aarhus N (DK)

(72) Inventors: Ciprian Biris, Hinnerup (DK); Gert Karmisholt Andersen, Hovedgård (DK); Uffe C. Merrild, Bryrup (DK); Leif Svinth Christensen, Thorsø (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/099,608

(22) PCT Filed: May 16, 2017

(86) PCT No.: PCT/DK2017/050156
§ 371 (c)(1),
(2) Date: Nov. 7, 2018

(87) PCT Pub. No.: WO2017/202428
PCT Pub. Date: Nov. 30, 2017

(65) Prior Publication Data
US 2019/0148949 A1 May 16, 2019

(30) Foreign Application Priority Data
May 25, 2016 (DK) .................................. 2016 70354

(51) Int. Cl.
*H02J 3/38* (2006.01)
*F03D 7/02* (2006.01)
(Continued)

(52) U.S. Cl.
CPC ............ *H02J 3/386* (2013.01); *F03D 7/0284* (2013.01); *F03D 7/044* (2013.01); *F03D 9/255* (2017.02);
(Continued)

(58) Field of Classification Search
CPC ........ H02P 9/007; F03D 9/255; F03D 7/0284; F03D 7/044
See application file for complete search history.

(56) References Cited

U.S. PATENT DOCUMENTS

2004/0026929 A1  2/2004 Rebsdorf et al.
2009/0021013 A1* 1/2009 Andresen ............ F03D 7/0272
                                                            290/44

(Continued)

FOREIGN PATENT DOCUMENTS

CN   101542864 A   9/2009
CN   101636899 A   1/2010
(Continued)

OTHER PUBLICATIONS

PCT International Search Report for Application No. PCT/DK2017/050156 dated Feb. 8, 2017.
(Continued)

*Primary Examiner* — Sean Gugger
(74) *Attorney, Agent, or Firm* — Patterson + Sheridan, LLP

(57) ABSTRACT

Aspects of the present invention relate to a method for controlling an amount of power to be delivered from a wind turbine generator to a power grid during an abnormal power grid event, the method comprising the steps of detecting an abnormal power grid event; controlling an active current delivered to the power grid in response to a measured or determined total active current; and controlling a reactive current delivered to the power grid in response to a measured
(Continued)

or determined total reactive current. Aspects of the present invention further relate to a computer program product for carrying out the method as well as a wind turbine generator being capable of carrying out embodiments of the invention.

20 Claims, 3 Drawing Sheets

(51) Int. Cl.
*F03D 7/04* (2006.01)
*H02P 9/00* (2006.01)
*F03D 9/25* (2016.01)
*H02J 3/00* (2006.01)

(52) U.S. Cl.
CPC .............. *H02P 9/007* (2013.01); *H02J 3/001* (2020.01); *Y02E 10/725* (2013.01); *Y02E 10/763* (2013.01)

(56) References Cited

U.S. PATENT DOCUMENTS

| | | | |
|---|---|---|---|
| 2009/0278351 A1 | 11/2009 | Rivas et al. | |
| 2011/0130889 A1* | 6/2011 | Khajehoddin | G05F 1/70 700/298 |
| 2012/0306204 A1* | 12/2012 | Garcia | H02J 3/1857 290/44 |
| 2012/0306277 A1* | 12/2012 | Garcia | H02J 3/1885 307/82 |
| 2015/0130187 A1* | 5/2015 | Yin | G05B 13/021 290/44 |
| 2015/0357820 A1* | 12/2015 | Sugimoto | H01M 10/44 307/52 |
| 2015/0365010 A1* | 12/2015 | Abe | H02M 1/36 363/37 |
| 2016/0218639 A1* | 7/2016 | Eren | H02M 7/797 |
| 2017/0234301 A1* | 8/2017 | Egedal | F03D 7/048 700/287 |
| 2019/0003456 A1* | 1/2019 | Garcia | F03D 7/0284 |
| 2019/0334352 A1* | 10/2019 | Sugimoto | H02J 3/46 |

FOREIGN PATENT DOCUMENTS

| | | |
|---|---|---|
| CN | 102082543 A | 6/2011 |
| CN | 104113077 A | 10/2014 |
| CN | 104362668 A | 2/2015 |
| CN | 105098834 A | 11/2015 |
| CN | 109378860 A | 2/2019 |
| EP | 2017936 A1 | 1/2009 |
| EP | 2696070 A1 | 2/2014 |
| WO | 2008040350 A2 | 4/2008 |
| WO | 2017202428 A1 | 11/2017 |

OTHER PUBLICATIONS

Jiefeng Hu et al:, "Control strategies of variable-speed wind system under new grid code requirement—A survey" IECON 2010—36th Annual Conference on IEEE Industrial Electronics Society, IEEE, Piscataway, NJ, USA, Nov. 7, 2010 (Nov. 7, 2010), pp. 3061-3066, XP031840087, ISBN: 978-1-4244-5225-5 Sections II and IV; figure 4a.
PCT Written Opinion of the International Searching Authority for Application No. PCT/DK2017/050156.
Danish Patent and Trademark Office First Technical Examination for Application No. PA 2016 70354 dated Dec. 19, 2016.
Chinese Office Action dated Oct. 8, 2019 for Application No. 201780032104.2.
Chinese Office Action for Application No. 201780032104.2 dated Jun. 23, 2020.

* cited by examiner

OPERATING A WIND TURBINE GENERATOR DURING AN ABNORMAL GRID EVENT

TECHNICAL FIELD

Aspects of the present invention relate to a wind turbine generator and a method for controlling an amount of power to be delivered from a wind turbine generator to a power grid during an abnormal power grid event.

BACKGROUND OF THE INVENTION

During an abnormal power grid event, it may be advantageous to maintain delivery of both active and reactive power to the power grid. In order to comply with this, the power producing units, such as wind turbine generators, coupled to the power grid should remain connected thereto.

DESCRIPTION OF ASPECTS OF THE INVENTION

During normal power grid conditions, wind turbine generators are typically operated in a so-called power mode. Upon detection of an abnormal power grid event the power mode operation is typically disabled and replaced by a so-called current mode operation.

In known arrangements, the current mode operation is implemented by delivering active and reactive currents to the power grid in a feed-forward implementation, i.e. in an open control loop implementation. It is well established that control systems which have only feed-forward behavior respond to input/control signals in a pre-defined manner without responding to how the loads on the control systems react. This may be disadvantageous when implemented for a control system of a doubly-fed induction generator (DFIG), e.g., where the rotor current references are to be set accurately.

It may be seen as an object of embodiments of the present invention to provide a method and a wind turbine generator that facilitate that a more accurate rotor current reference may be provided during an abnormal power grid event.

The above-mentioned object is complied with by providing, in a first aspect, a method for controlling an amount of power to be delivered from a wind turbine generator to a power grid during an abnormal power grid event, the method comprising the steps of
  1) detecting an abnormal power grid event;
  2) controlling an active current delivered to the power grid in response to a measured or determined total active current; and
  3) controlling a reactive current delivered to the power grid in response to a measured or determined total reactive current.

In the present disclosure the abnormal power grid event may involve a voltage change on the power grid, such as in connection with a low-voltage ride through (LVRT) event, an under-voltage ride through (UVRT) event, an over-voltage ride through (OVRT) event or a high-voltage ride through (HVRT) event, where the wind turbine generator remains connected to the power grid in order to support the power grid during the abnormal power grid event.

The step of the detecting that an abnormal power grid event has occurred may involve detection of a grid voltage change. In case of an LVRT or a UVRT event, the grid voltage may in principle drop to any voltage level between 0 and 100% of the nominal grid voltage level. In case of an OVRT or an HVRT event, the grid voltage may in principle take any voltage level above the nominal grid voltage level.

The voltage change may be measured using one or more software controlled voltage sensors connected to one or more phases.

The duration of an abnormal power grid event may typically vary from a fraction of a second to perhaps several minutes depending on the type of abnormality. Before and after an abnormal power grid event the wind turbine generator may be operated in a power mode, whereas during the abnormal power grid events, such as an LVRT, an UVRT, an OVRT or an HVRT event, the wind turbine generator is operated according to embodiments of the method according to the present invention.

The measured or determined total active current and the measured or determined total reactive current may comprise respective active and reactive current contributions from both the stator and rotor currents of a generator of the wind turbine generator.

When an abnormal power grid event has been detected the method may further comprise the step of enabling an active current regulator and a reactive current regulator. The active current regulator as well as the reactive current regulator may form part of respective outer closed control loops where the measured or determined total active current and the measured or determined total reactive current may form the respective feedback signals.

The active and reactive current regulators may in principle be any kind of regulators, including PI, PD, PID regulators or combinations thereof.

In the outer closed control loop for active current control the measured or determined total active current may be subtracted from an active current reference so as to form an input signal to the active current regulator. Similarly, in the outer closed control loop for reactive current control the measured or determined total reactive current is subtracted from a reactive current reference so as to form an input signal to the reactive current regulator.

The active current regulator may provide an active rotor reference signal that may form at least a portion of a control signal to an active current rotor controller which may form part of an inner closed control loop for active current control. In the inner closed control loop for active current control a measured or determined active rotor current may be subtracted from the active rotor reference signal provided by the active current regulator so as to form an input signal to the active current rotor controller.

Similarly, the reactive current regulator may provide a reactive rotor reference signal that may form at least a portion of a control signal to a reactive current rotor controller which may form part of an inner closed control loop for reactive current control. In the inner closed control loop for reactive current control a measured or determined reactive rotor current may be subtracted from the reactive rotor reference signal provided by the reactive current regulator so as to form an input signal to the reactive current rotor controller.

The active current rotor controller may be arranged to generate a q-axis rotor voltage, whereas the reactive current rotor controller may be adapted to generate a d-axis rotor voltage.

Embodiments of the method according to the present invention may further comprise the step of disabling the active and reactive current regulators when then abnormal power grid event is no longer present. With the disabling of the active and reactive current regulators the wind turbine generator may return to power operation.

The generator of the wind turbine generator may be a doubly-fed induction generator (DFIG). However, other types of generators may be applicable as well.

In a second aspect, the present invention relates to a computer program product directly loadable into the internal memory of at least one digital computer, said computer program product comprising software code portions for carrying out the steps of the method according to the first aspect when said computer program product is run on the at least one digital computer.

In a third aspect, the present invention relates to a wind turbine generator comprising a power controller for controlling an amount of power to be delivered to a power grid during an abnormal power grid event, the power controller comprising
1) a detector for detecting an abnormal power grid event;
2) a first closed control loop for controlling an active current delivered to the power grid; and
3) a second closed control loop for controlling a reactive current delivered to the power grid.

Again, the abnormal power grid event may involve a voltage drop on the power grid, such as in connection with an LVRT, an UVRT, an OVRT or an HVRT event, where the wind turbine generator remains connected to the power grid in order to support the power grid during the abnormal power grid event. The generator of the wind turbine generator may comprise DFIG.

The detector for detecting that an abnormal power grid event has occurred may involve one or more software controlled voltage sensors capable of detecting when the grid voltage changes. In case of an LVRT or a UVRT event the grid voltage may in principle drop to any voltage level between 0 and 100% of the nominal grid voltage level. In case of an OVRT or an HVRT event the grid voltage may in principle take any voltage level above the nominal grid voltage level. The voltage changes may be detected in one or more phases.

As previously addresses the duration of an abnormal power grid event may typically vary from a fraction of a second to several minutes. Before and after an abnormal power grid event the wind turbine generator may be operated in a power mode, whereas during the abnormal power grid events, such as an LVRT, an UVRT, an OVRT or an HVRT event, the wind turbine generator is operated according to embodiments of the method of the first aspect of the present invention.

The first closed control loop may comprise an outer active closed control loop comprising an active current regulator, and an inner active closed control loop comprising an active current rotor controller, and wherein the active current regulator provides at least a portion of a control signal to the active current rotor controller. As part of the outer active closed control loop a measured or determined total active current may be subtracted from an active current reference so as to form an input signal to the active current regulator. As part of the inner active closed control loop a measured or determined active rotor current may be subtracted from an active rotor reference provided by the active current regulator so as to form an input signal to the active current rotor controller.

Similarly, the second closed control loop may comprise an outer reactive closed control loop comprising a reactive current regulator, and an inner reactive closed control loop comprising a reactive current rotor controller, and wherein the reactive current regulator provides at least a portion of a control signal to the reactive current rotor controller. As part of the outer reactive closed control loop a measured or determined total reactive current may be subtracted from a reactive current reference so as to form an input signal to the reactive current regulator. As part of the inner reactive closed control loop a measured or determined reactive rotor current may be subtracted from a reactive rotor reference provided by the reactive current regulator so as to form an input signal to the reactive current rotor controller.

BRIEF DESCRIPTION OF THE DRAWINGS

The present invention will now be described in further details by way of embodiments and with reference to the accompanying figures, wherein FIG. 1 schematically shows a wind turbine generator applying a doubly-fed induction generator, FIG. 2 schematically shows closed control loops for controlling the active and reactive currents during an abnormal power grid event.

Figure 1:
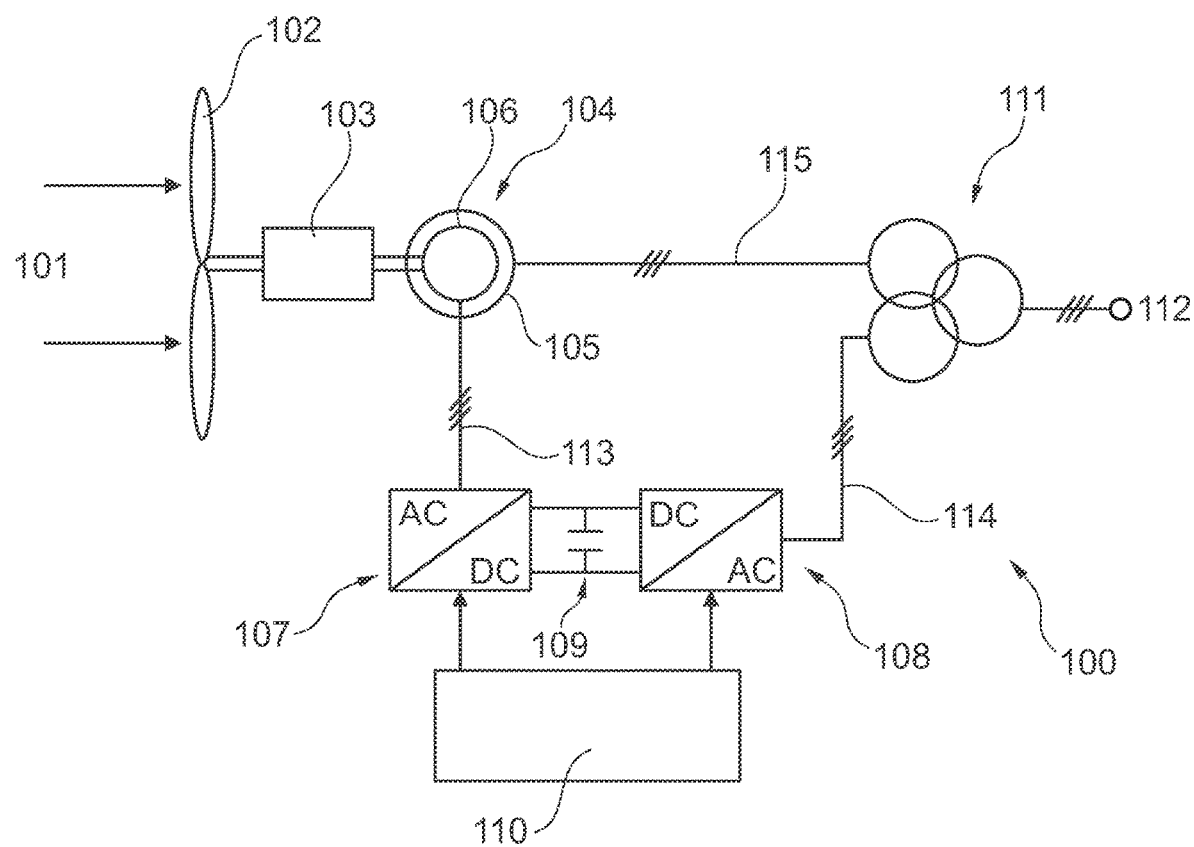

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE EMBODIMENTS

An aspect of the present invention relates to a method for operating a wind turbine generator during an abnormal power grid event, such as during a power grid voltage change including an LVRT event, an UVRT event, an OVRT event or an HVRT event. When an abnormal power grid event is detected the operation of the wind turbine generator is shifted from a power mode to a current mode. After the abnormal power grid event operation is resumed in power mode.

Referring now to FIG. 1 a wind turbine generator 100 involving a DFIG 104 is depicted. As seen in FIG. 1 the rotor 106 of the DFIG 104 is coupled to a set of rotor blades 102 via an optional gearbox 103. The rotor blades 102 rotate in response to incoming wind power 101. The DFIG 104 is adapted to deliver power to the power grid 112 via an optional grid transformer 111 via two three phase branches 113, 114 and 115. In the latter of the two three phase branches 115 power is delivered from the stator 105 of the DFIG 104 to the optional grid transformer 111. The other of the two three phase branches 113, 114 further comprises a frequency power converter involving a rotor-side AC/DC inverter 107 and a grid-side DC/AC inverter 108 being separated by an intermediate DC link 109. The rotor-side AC/DC inverter 107 and the grid-side DC/AC inverter 108 is controlled by a power controller 110. Power may flow in both directions in the three phase branches 113, 114.

During normal operation the wind turbine generator 100 is typically operated in a so-called power mode where the amount of active and reactive power to be delivered to the power grid 112 is set by respective active and reactive power references.

As addressed above the abnormal power grid event may involve an LVRT, an UVRT, an OVRT or an HVRT event. In case of an LVRT or a UVRT event, the grid voltage may in principle drop to any voltage level between 0 and 100% of the nominal grid voltage level. In case of an OVRT or an HVRT event, the grid voltage may in principle take any voltage level above the nominal grid voltage level. When an abnormal power grid event has been detected the power mode is disabled and the wind turbine generator is reconfigured to be operable in a so-called total current mode. This implies that two current control loops—one active current control loop and one reactive current control loop—are established, cf. FIG. 2.

Figure 2:
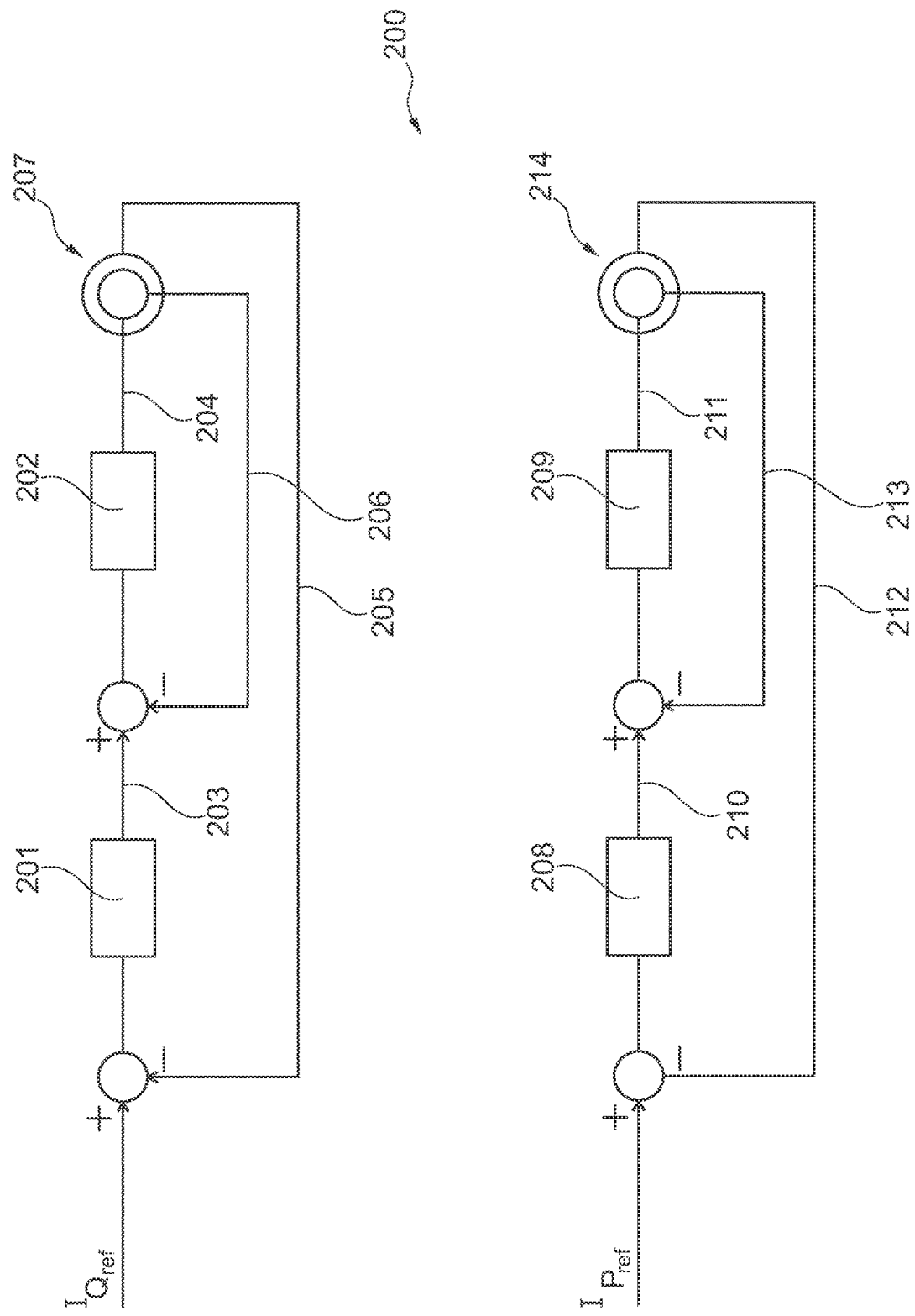

Referring now to FIG. 2 two closed control loops 200 are depicted. The upper closed control loop controls the d-axis rotor voltage 204 and thereby the reactive rotor current, whereas the lower closed control loop controls the q-axis rotor voltage 211 and thereby the active rotor current. Referring now to the upper reactive control loop a reactive current reference $I_{Qref}$ is provided to the left. This reactive current reference is compared to a total reactive current 205 being provided by the stator of the DFIG 207 and the grid-side inverter (not shown). The difference between the reactive current reference, $I_{Qref}$, and the measured or determined total reactive current 205 is provided to the regulator 201 (reactive current regulator) which generates a reactive rotor reference 203. The reactive rotor reference 203 is compared to a measured or determined reactive rotor current 206 and the difference between them is provided to the regulator 202 (reactive current rotor controller) which generates the d-axis rotor voltage 204. Referring now to the lower active control loop an active current reference $I_{Pref}$ is provided to the left. This active current reference is compared to a total active current 212 being provided by the stator of the DFIG 214 and the grid-side inverter (not shown). The difference between the active current reference, $I_{Pref}$, and the measured or determined total active current 212 is provided to the regulator 208 (active current regulator) which generates an active rotor reference 210. The active rotor reference 210 is compared to a measured or determined active rotor current 213 and the difference between them is provided to the regulator 209 (active current rotor controller) which generates the q-axis rotor voltage 211. The regulators 201, 202, 208 and 209 may in principle be of any type, such as for example PI, PD or PID. Thus, during the abnormal power grid event the DFIG 207, 214 is controlled in a closed loop current configuration where current input references $I_{Qref}$ and $I_{Pref}$ are provided for the reactive and active current loops, respectively. When the abnormal power grid event has terminated the power mode of the wind turbine generator is reinstated.

Figure 3:
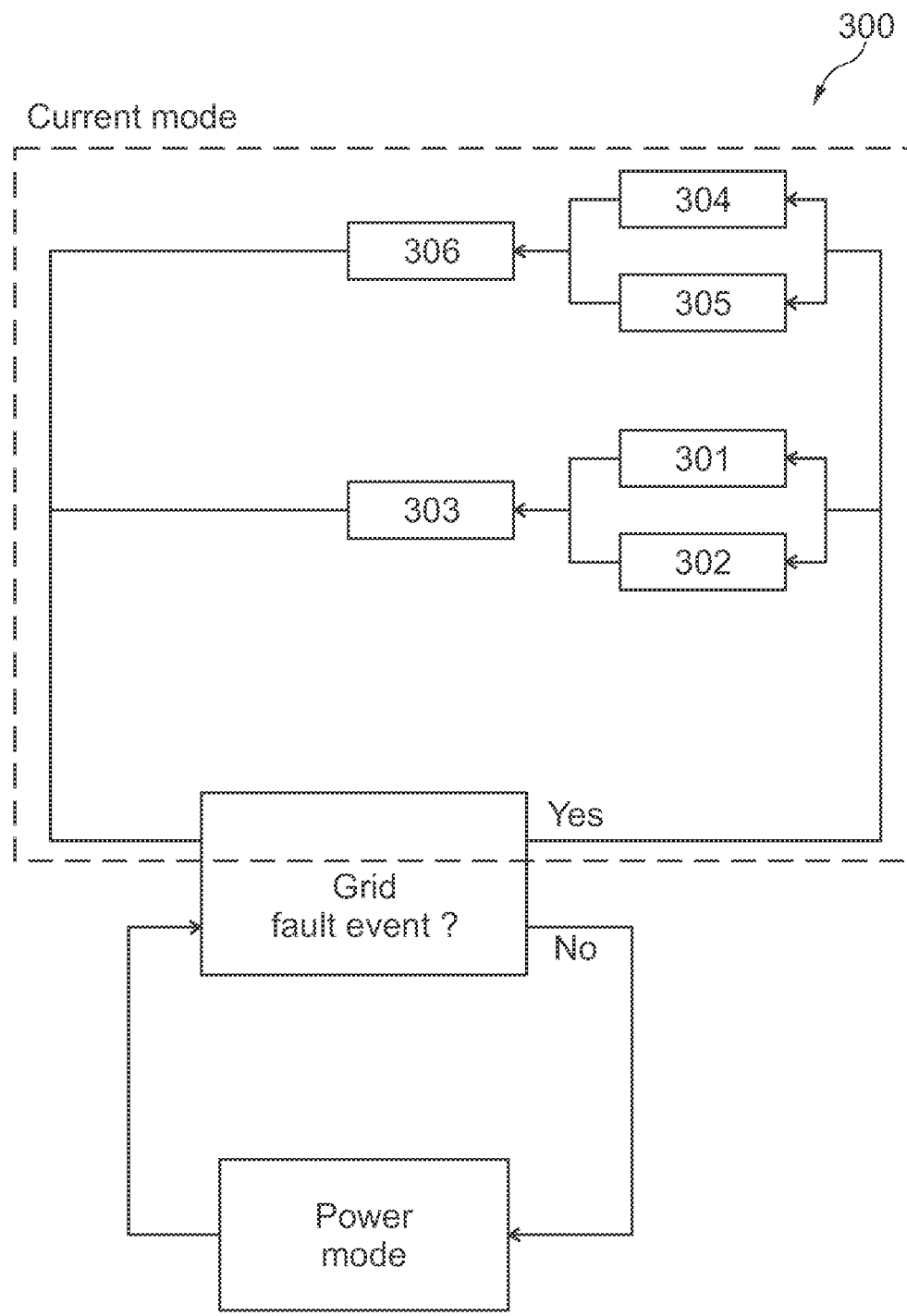
FIG. 3 shows a flow-chart schematically illustrating the method according to aspects of the present invention.

In FIG. 3 a flow-chart 300 illustrating aspects of the method according to the present invention is depicted. As depicted in FIG. 3 if no abnormal power grid event is detected, i.e. if no grid fault is detected, the wind turbine generator is operated in a power mode. On the contrary, if an abnormal power grid event is detected the wind turbine generator is operated in a current mode. In the current mode the total active DFIG current 301 as well as the active rotor current 302 are measured, or determined, and a resulting q-axis rotor voltage 303 is generated. Similarly, the total reactive DFIG current 304 as well as the reactive rotor current 305 are measured, or determined, and a resulting d-axis rotor voltage 303 is generates. The generated q-axis and d-axis rotor voltages 303, 306 are provided to the DFIG as long as the abnormal power grid event is present. The method illustrated in FIG. 3 may be implemented using variable means, such as a pure software implementation.

The invention claimed is:

1. A method for controlling an amount of power to be delivered from a wind turbine generator to a power grid during an abnormal power grid event, the method comprising:
   responsive to detecting the abnormal power grid event, transitioning control of the wind turbine generator from a power mode to a current mode; and
   within the current mode:
   controlling, using a first closed control loop, an active current delivered to the power grid in response to a determined total active current; and
   controlling, using a second closed control loop, a reactive current delivered to the power grid in response to a determined total reactive current,
   wherein one or both of the first closed control loop and the second closed control loop respectively comprises:
   an outer closed control loop comprising a current regulator; and
   an inner closed control loop comprising a current rotor controller,
   wherein the current regulator provides at least a portion of a control signal to the current rotor controller.

2. The method according to claim 1, wherein the abnormal power grid event involves a voltage change on the power grid.

3. The method according to claim 1, wherein the determined total active current and the determined total reactive current comprise respective active and reactive current contributions from both stator and rotor currents of an electrical generator of the wind turbine generator.

4. The method according to claim 1, wherein transitioning control of the wind turbine generator from the power mode to the current mode comprises:
   enabling an active current regulator and a reactive current regulator.

5. The method according to claim 4, wherein the determined total active current is subtracted from an active current reference so as to form an input signal to the active current regulator.

6. The method according to claim 5, wherein the active current regulator provides at least a portion of a control signal to an active current rotor controller.

7. The method according to claim 4, wherein the determined total reactive current is subtracted from a reactive current reference so as to form an input signal to the reactive current regulator.

8. The method according to claim 7, wherein the reactive current regulator provides at least a portion of a control signal to a reactive current rotor controller.

9. The method according to claim 4, further comprising:
   disabling the active current regulator and the reactive current regulator when the abnormal power grid event is no longer present.

10. The method according to claim 1, wherein the wind turbine generator comprises a doubly-fed induction generator.

11. The method of claim 1,
    wherein in the first closed control loop:
    the current regulator receives a difference of an active current reference and the determined total active current, and generates an active rotor reference, and
    the current rotor controller receives a difference of the active rotor reference and an active rotor current, and generates a q-axis rotor voltage, and wherein in the second closed control loop:
the current regulator receives a difference of a reactive current reference and the determined total reactive current, and generates an reactive rotor reference, and
the current rotor controller receives a difference of the reactive rotor reference and a reactive rotor current, and generates a d-axis rotor voltage.

12. The method of claim 1, wherein in the power mode the wind turbine generator generates power according to an active power reference and a reactive power reference.

13. A computer program product directly loadable into the internal memory of at least one digital computer, said computer program product comprising software code portions for carrying out an operation for controlling an amount of power to be delivered from a wind turbine generator to a power grid during an abnormal power grid event when said computer program product is run on the at least one digital computer, the operation comprising:
responsive to detecting the abnormal power grid event, transitioning control of the wind turbine generator from a power mode to a current mode; and
within the current mode:
controlling, using a first closed control loop, an active current delivered to the power grid in response to a determined total active current; and
controlling, using a second closed control loop, a reactive current delivered to the power grid in response to a determined total reactive current,
wherein one or both of the first closed control loop and the second closed control loop respectively comprises:
an outer closed control loop comprising a current regulator; and
an inner closed control loop comprising a current rotor controller,
wherein the current regulator provides at least a portion of a control signal to the current rotor controller.

14. The computer program product of claim 13, wherein the operation further comprises:
controlling, in the power mode, power generation by the wind turbine generator according to an active power reference and a reactive power reference.

15. A wind turbine generator comprising:
a power controller configured to control an amount of power to be delivered to a power grid during an abnormal power grid event, the power controller comprising:

a detector configured to detect the abnormal power grid event, wherein the power controller is configured to transition from a power mode to a current mode responsive to detecting the abnormal power grid event;
a first closed control loop configured to control, in the current mode, an active current delivered to the power grid; and
a second closed control loop configured to control, in the current mode, a reactive current delivered to the power grid,
wherein one or both of the first closed control loop and the second closed control loop respectively comprises:
an outer closed control loop comprising a current regulator; and
an inner closed control loop comprising a current rotor controller,
wherein the current regulator provides at least a portion of a control signal to the current rotor controller.

16. The wind turbine generator according to claim 15, wherein the first closed control loop comprises:
an outer active closed control loop comprising an active current regulator, and
an inner active closed control loop comprising an active current rotor controller wherein the active current regulator provides at least a portion of a control signal to the active current rotor controller.

17. The wind turbine generator according to claim 16, wherein a determined total active current is subtracted from an active current reference so as to form an input signal to the active current regulator.

18. The wind turbine generator according to claim 15, wherein the second closed control loop comprises:
an outer reactive closed control loop comprising a reactive current regulator, and
an inner reactive closed control loop comprising an reactive current rotor controller wherein the reactive current regulator provides at least a portion of a control signal to the reactive current rotor controller.

19. The wind turbine generator according to claim 18, wherein a determined total reactive current is subtracted from a reactive current reference so as to form an input signal to the reactive current regulator.

20. The wind turbine generator according to claim 15, further comprising:
a doubly-fed induction generator.

* * * * *